No. 801,255. PATENTED OCT. 10, 1905.
C. B. MILLS.
ARMATURE CROSS CONNECTION FOR ELECTRICAL MACHINES.
APPLICATION FILED OCT. 20, 1904.

3 SHEETS—SHEET 1.

WITNESSES:
C. L. Belcher
Otto S. Schairer

INVENTOR
Chester B. Mills
BY
Wesley G. Carr
ATTORNEY

No. 801,255. PATENTED OCT. 10, 1905.
C. B. MILLS.
ARMATURE CROSS CONNECTION FOR ELECTRICAL MACHINES.
APPLICATION FILED OCT. 20, 1904.

3 SHEETS—SHEET 2.

No. 801,255. PATENTED OCT. 10, 1905.
C. B. MILLS.
ARMATURE CROSS CONNECTION FOR ELECTRICAL MACHINES.
APPLICATION FILED OCT. 20, 1904.
3 SHEETS—SHEET 3.
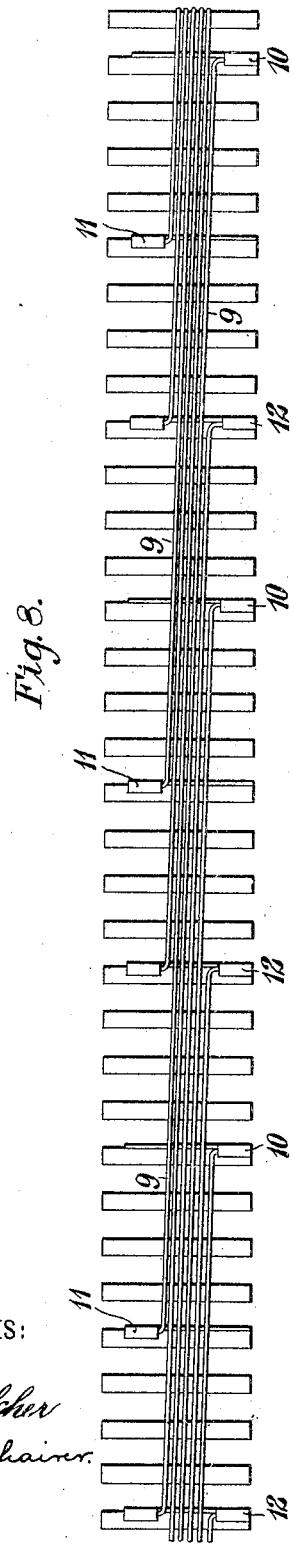
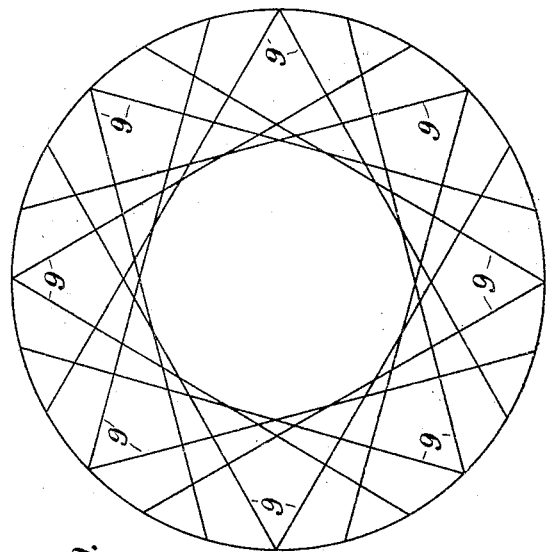
WITNESSES:
C. L. Belcher
Otto S. Schainr.
INVENTOR
Chester B. Mills
BY
ATTORNEY

UNITED STATES PATENT OFFICE.

CHESTER B. MILLS, OF WILMERDING, PENNSYLVANIA, ASSIGNOR TO WESTINGHOUSE ELECTRIC & MANUFACTURING COMPANY, A CORPORATION OF PENNSYLVANIA.

ARMATURE CROSS CONNECTION FOR ELECTRICAL MACHINES.

No. 801,255.  Specification of Letters Patent.  Patented Oct. 10, 1905.

Application filed October 20, 1904. Serial No. 229,343.

*To all whom it may concern:*

Be it known that I, CHESTER B. MILLS, a citizen of the United States, and a resident of Wilmerding, in the county of Allegheny and State of Pennsylvania, have invented a new and useful Improvement in Armature Cross Connections for Electrical Machines, of which the following is a specification.

My invention relates to electrical machines having parallel-wound armatures, and particularly to means for cross-connecting points in the armature-windings, which are of normally equal potential.

One object of my invention is to provide a cross-connecting means which shall be simple in construction and easily applied and so located that convenient access may be had thereto for the purpose of making repairs.

A further object of my invention is to provide such symmetrical arrangement of the armature cross-connecting devices that the armature structure as a whole shall be perfectly balanced, and therefore satisfactory in operation.

Figure 1:
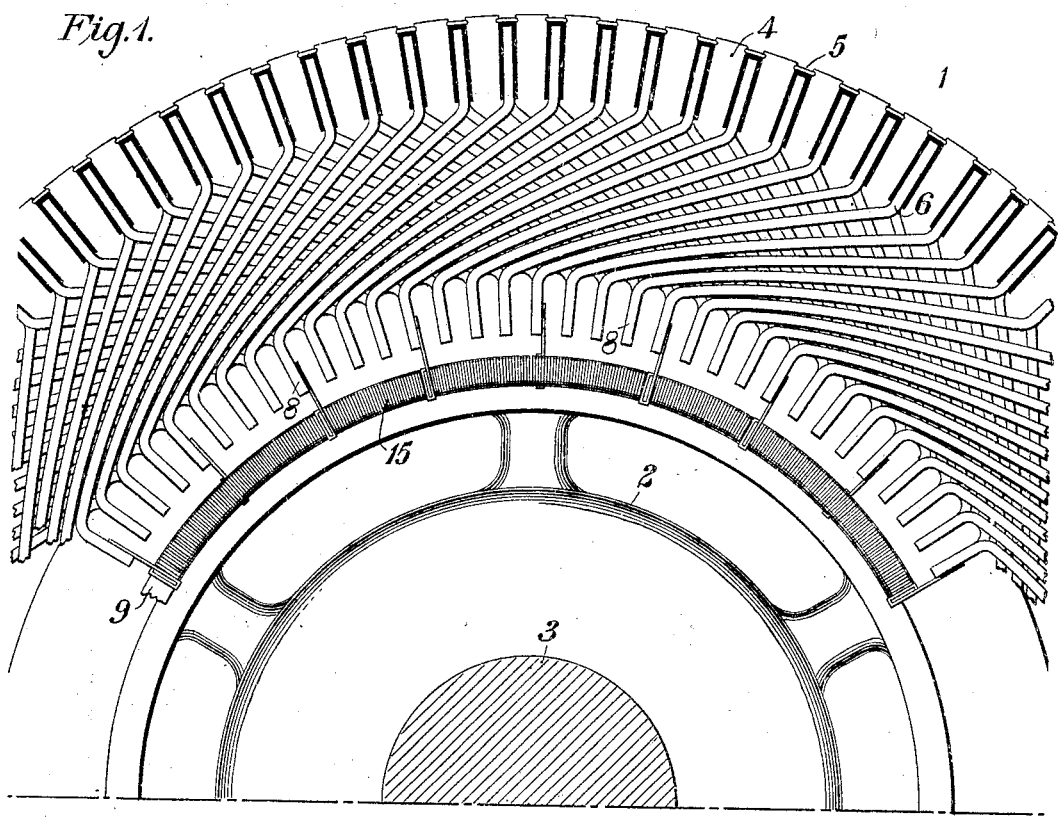
Figure 2:
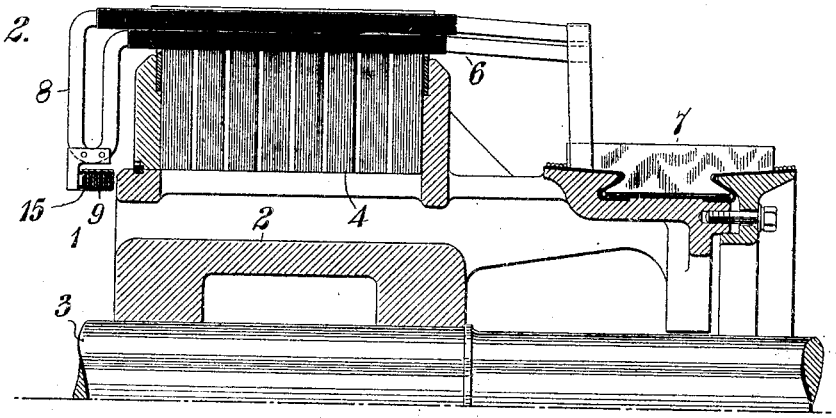
Figure 3:
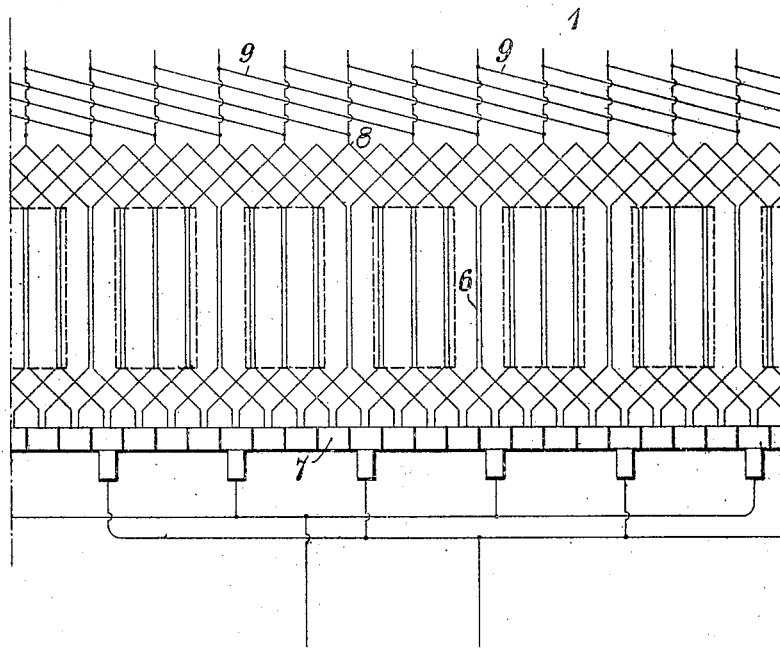
Figure 4:
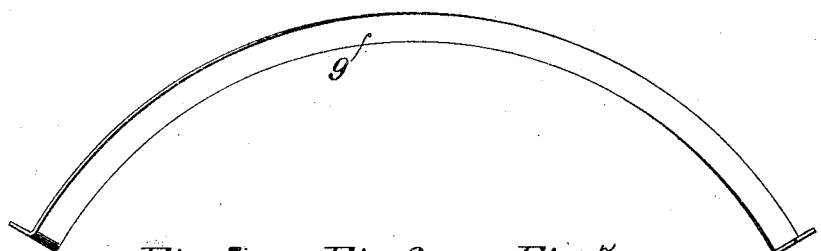
Figure 5:
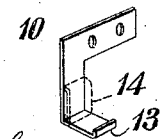
Figure 6:
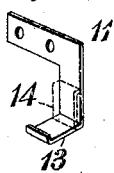
Figure 7:
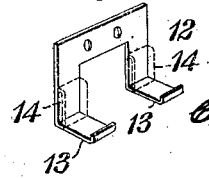

In the accompanying drawings, Figure 1 is an end elevation of a portion of an armature embodying my invention. Fig. 2 is a longitudinal sectional view through one-half of an armature and commutator embodying my invention. Fig. 3 is a development diagram of a commutator and an armature-winding provided with cross connections. Fig. 4 is a perspective view of one of the cross-connecting ring-segments. Figs. 5, 6, and 7 are perspective views of three forms of bracket-clips for supporting the cross-connecting ring-segments. Fig. 8 is a diagrammatic development of a portion of the cross-connecting ring-segments and the armature-coils to which they are connected, and Fig. 9 is a diagram illustrating the relative arrangement of the cross-connecting ring-segments.

The armature 1 comprises a spider 2, mounted upon a shaft 3 and provided with a laminated core 4, having slots 5, in which are located coils 6, so arranged and connected as to to constitute what is known as a "parallel winding." The coils 6 are connected at one end of the armature to the bars of a commutator 7 in the usual manner and at the opposite end are provided with inwardly-projecting portions 8, which are so formed as to insure a symmetrical non-interfering arrangement, such as is usual in this class of apparatus.

The parts thus far described are well known in the art and may conform to any construction usually employed.

While I have not deemed it necessary to show a field-magnet structure, the diagrammatic indications of field-magnet poles, as well as the structure and arrangement of the cross-connecting devices and the armature-winding, which will be now described, serve to indicate that the machine illustrated is of the six-pole type.

There being six field-magnet poles, it is essential for proper balancing conditions that there shall be at least three points of normally equal potential connected together, and in order to insure a satisfactory balancing condition of circuits it is desirable that a number of sets of such connected three points be symmetrically disposed about the armature. As indicated in Fig. 9, I provide eight such sets of three connected points of normally equal potential, and in order to connect such points I provide sixteen ring-segments 9, of strap-copper, one of which is indicated in Fig. 4. Each of the ring-segments is preferably insulated by means of suitable tape before it is applied to the machine. In order to support and electrically connect these ring-segments to the proper armature-coils, I provide eight left-hand bracket-clips 10, formed of strap-copper and bent to angular form, as is indicated in Fig. 5, the same number of right-hand bracket-clips 11, also formed of strap-copper and bent to the angular form indicated in Fig. 6, and the same number of double bracket-clips 12 of the form indicated in Fig. 7. These bracket-clips are fastened to the inner ends of the projecting portions 8 of the proper armature-coils by means of screws or rivets and also by means of solder, if desired, the three forms 10, 11, and 12 being arranged in regular alternating sequence around the armature.

The respective ends of each ring-segment 9 are bent in opposite directions substantially at right angles to the plane of the segment, and these ends are fastened to and supported by the bracket-clips by bending the free ends 13 of these clips about the corresponding ends of the ring-segments, as indicated in broken lines at 14 in each of Figs. 5, 6, and 7. The ends of the ring-segments and the bracket-clips may also be joined by means of solder, if desired, and electrical requirements will ordinarily make such connection of parts advisable.

It will be seen by reference to Fig. 8 that the use of the three forms of bracket-clip 10, 11, and 12 and the symmetrical arrangement of these devices, together with the oppositely-bent ends of the ring-segments 9, permits of a symmetrical arrangement of the several ring-segments of the entire set, so that there is no interference between them and so that the armature is perfectly balanced.

After the ring-segments are all attached to the proper bracket-clips they are preferably bound together in a single body by means of cord 15, wound around them, as indicated in Fig. 1.

In Fig. 3 the cross connections are shown as providing a continuous circuit that extends entirely around the armature, while in Figs. 8 and 9 the three points of normally equal potential are shown as joined by only two connectors, which will ordinarily be found sufficient to equalize the potential if they are of relatively low resistance.

As already indicated, the invention is not limited to use in connection with a six-pole machine and neither is it limited to any specific form and arrangement of armature-coils. The form and dimensions of the ring-segments and of the bracket-clips are also susceptible of modification within the scope of the invention in order to adapt them to machines having different numbers of poles and also having other characteristics which are different from those here specifically shown and described.

I claim as my invention—

1. In an electrical machine, the combination with an armature-winding having bracket-clips mechanically and electrically connected to the ends of certain of the coils thereof, of a plurality of ring-segments symmetrically disposed around the armature and having their ends fastened to said bracket-clips.

2. In an electrical machine, the combination with an armature-winding having bracket-clips attached to and in electrical contact with the ends of certain of the coils thereof, of a set of overlapping ring-segments symmetrically disposed around the armature, each of said segments having its ends fastened to two of said bracket-clips.

3. In an electrical machine, the combination with an armature-winding having bracket-clips attached to and in electrical contact with the ends of equally-spaced coils thereof, of a plurality of ring-segments the ends of each of which are clamped and soldered to two of said bracket-clips.

4. In an electrical machine, the combination with an armature-winding having right-hand, left-hand and double angle-bracket clips attached to and in electrical contact with certain equally-spaced coils thereof, of a plurality of ring-segments symmetrically disposed around the armature and severally attached at their ends to two of said bracket-clips.

5. In an electrical machine, the combination with an armature having coils which are connected at one end to commutator-bars and some of which are provided at the opposite end with bracket-clips, of a plurality of ring-segments symmetrically disposed around the armature and severally connected, at their ends, to said bracket-clips.

6. In an electrical machine, the combination with an armature-winding, certain equally-spaced coils of which are severally provided with bracket-clips, of a plurality of curved strap conductors symmetrically disposed in overlapping relation and each having its ends fastened to two of said bracket-clips.

7. In an electrical machine having a commutator, the combination with an armature-winding the coils of which are connected at one end to the commutator-bars and some of which are severally provided at the opposite end with bracket-clips, of a plurality of curved strap conductors that are severally clamped at their ends to two of said bracket-clips.

8. In an electrical machine, the combination with an armature-winding, the ends of certain coils of which are severally provided with right-hand bracket-clips, the ends of certain other coils of which are severally provided with left-hand bracket-clips and the ends of certain other coils of which are severally provided with double bracket-clips, said bracket-clips being symmetrically disposed in alternation around the armature, of a plurality of curved strap conductors, each of which has its ends bent laterally in opposite directions and fastened to two of said bracket-clips.

In testimony whereof I have hereunto subscribed my name this 28th day of September, 1904.

CHESTER B. MILLS.

Witnesses:
S. N. ORR,
BIRNEY HINES.